United States Patent [19]
Byrd

[11] 3,986,028
[45] Oct. 12, 1976

[54] AUTOMATIC GAMMA RADIATION SCANNING DEVICE AND FEED MECHANISM FOR PLURAL SAMPLE HOLDERS

[75] Inventor: William J. Byrd, Solana Beach, Calif.

[73] Assignee: The Salk Institute for Biological Studies, San Diego, Calif.

[22] Filed: Jan. 20, 1975

[21] Appl. No.: 542,118

[52] U.S. Cl. .............................. 250/328
[51] Int. Cl.² ........................... G01T 1/100
[58] Field of Search .......... 250/363, 328, 337, 364

[56] References Cited
UNITED STATES PATENTS

| | | | |
|---|---|---|---|
| 2,826,076 | 3/1958 | Boretz et al. | 250/238 |
| 3,433,956 | 3/1969 | Hunkar | 250/328 |
| 3,809,901 | 5/1974 | Szalanczy et al. | 250/337 |
| 3,855,473 | 12/1974 | Burgess et al. | 250/328 |

Primary Examiner—Alfred E. Smith
Assistant Examiner—David K. Moore
Attorney, Agent, or Firm—Fitch, Even, Tabin & Luedeka

[57] ABSTRACT

Apparatus is disclosed for measuring the level of gamma radiation contained in a plurality of biological samples which are located on the fibrous sheet member carried by a sample holder. The apparatus is adapted to count the radiation level of the number of closely spaced samples located in rows and columns on the sheet by automatically sequencing through the individual samples within the rows and to advance the holder to bring successive rows into proximity with the detector. The detector is moved from sample to sample within the rows, although a number of detectors can be employed. A plurality of sample holders are automatically advanced to the detector.

25 Claims, 5 Drawing Figures

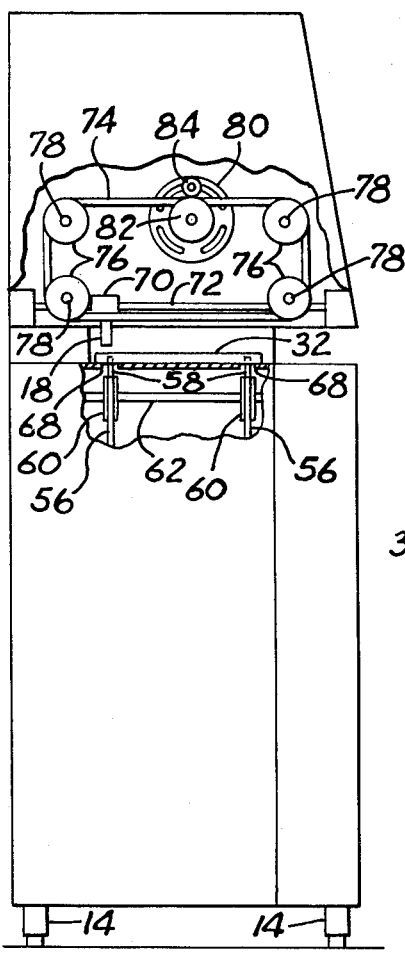
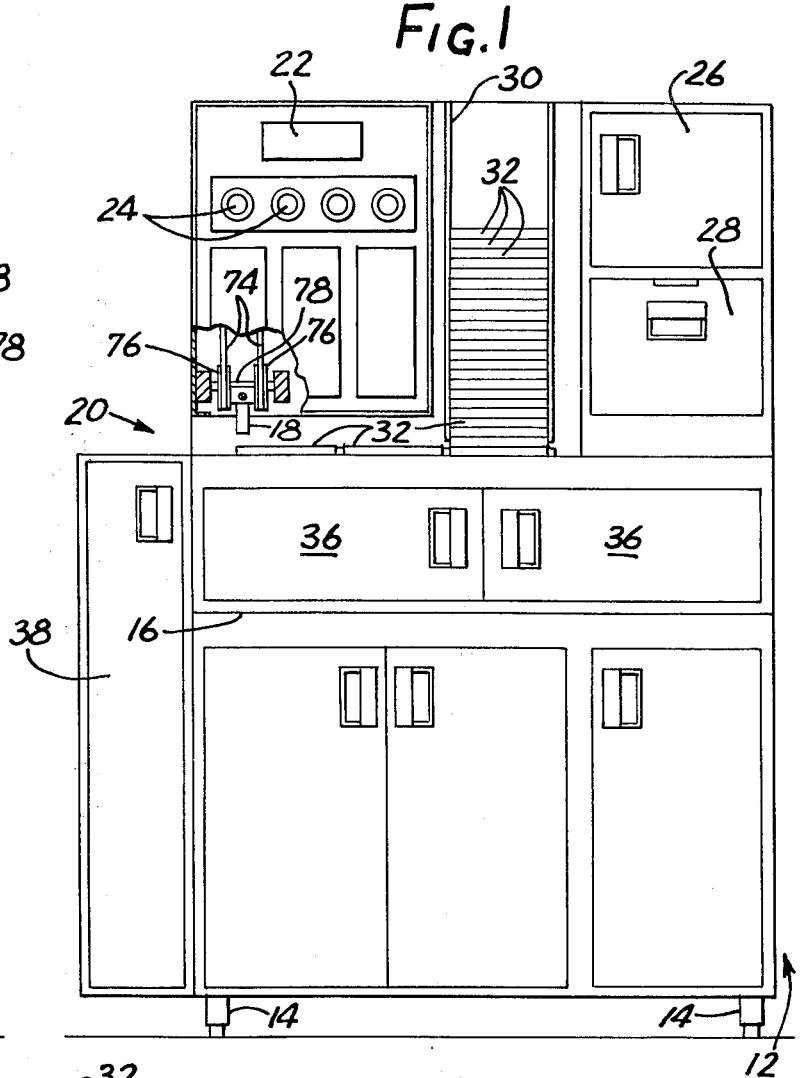
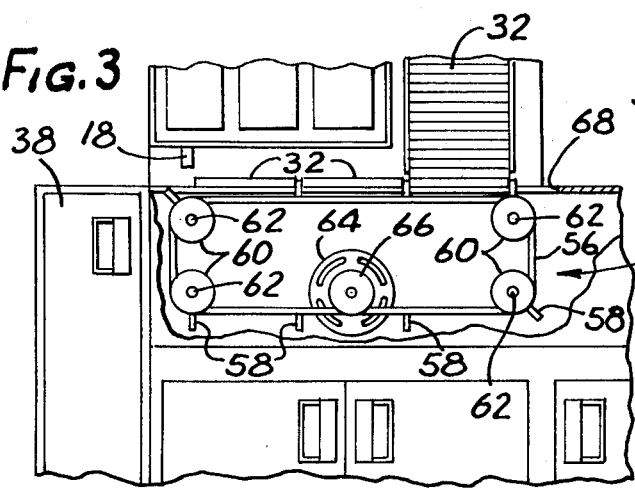
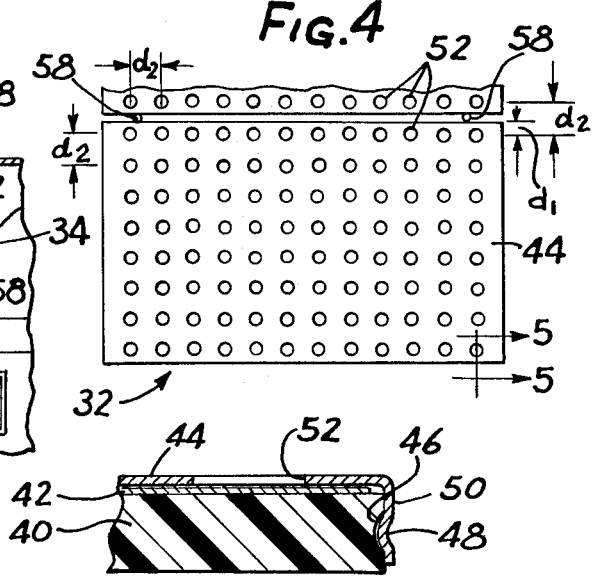

AUTOMATIC GAMMA RADIATION SCANNING DEVICE AND FEED MECHANISM FOR PLURAL SAMPLE HOLDERS

The invention described herein was made in part in the course of, or under, a grant of the U.S. Public Health Service, Department of Health, Education, and Welfare.

The present invention generally relates to automatic gamma radiation counting apparatus and, more specifically, to apparatus which can, with little sample preparation, automatically index and measure an extremely large number of individual samples located in a relatively high sample density matrix.

One of the most common pieces of apparatus used in basic research in microbiology and immunology is a scintillation counting apparatus. This device, as the name implies, takes advantage of the fact that in certain chemical reagents, weak radioactive emitters such as beta particles cause these solutions to emit photons of light. The automatic equipment that is currently used in such scintillation counting is extremely expensive from the standpoint of initial capital outlay as well as in the continuing normal operating and handling expenses. A major disadvantage of the scintillation equipment is the fact that it requires each individual sample to be in a separate vial. Consequently, a technician must do a considerable amount of work in preparing each of the samples before it can be measured. Since technicians are skilled and expensive, they could be performing other more productive endeavors than performing the somewhat menial repetitive task of preparing sample vials, which becomes an extremely large number of samples in a continuing research program. Moreover, the cost of vials themselves can become quite large, e.g., 500 vials may exceed $40.00 in cost. Over an extended period where many thousands of samples are prepared, the cost of the vials alone involves an expenditure that researchers often feel is relatively wasteful in terms of their priorities.

Another significant disadvantage of the scintillation technique involves the many compensating and corrective steps that are necessary to obtain meaningful, reliable results. The fact that the sample is in solution within the vial precipitates many problems and necessitates the employment of compensating techniques and external checks. If a sample is colored, for example, the light passing through the solution may be quenched and the efficiency of the machine is reduced. To assure the accuracy of the radiation count, scintillation equipment usually has an automatic external standard comprising a radium pellet that is brought into proximity to the detector during the counting process. Two counts of the sample are then made, one being under the influence of the radium pellet and the other a raw count when the pellet is removed. Since it is necessary for the sample to be in solution before any of the quench correcting techniques can be applied, it is routinely necessary to add solubilizers to each individual vial. This utilizes additional technician time, and, moreover, many of the samples which have the solubilizing agent added will exhibit chemiluminescence for some time after the addition of the solubilizer, thus necessitating a further delay in the precise counting of the sample.

While most of these effects can be compensated for, each of the compensation steps requires additional time in processing by skilled technicians and the like, all of which adds to the cost of research and, because of the time required, reduces the effective number of samples that can be studied.

Quite obviously then, there has been considerable impetus for the development of gamma radiation tracer techniques which would obviate all the aforementioned shortcomings of scintillation counters. Many such techniques have now been developed. In these situations also, unfortunately, the initial investment in the cost of the counting equipment is high, and they too require considerable technician preparation of the final sample, for almost without exception these devices are best suited for counting samples which are held in test tubes. Increasingly samples can now be harvested into linear arrays on various matrices.

Accordingly, it is an object of the present invention to provide an improved apparatus which can effectively measure gamma radiation labels in samples at a substantially reduced cost and without introducing error-producing influences.

Yet another object is to provide an apparatus that will automatically count an extremely larger number of samples, each of which individual samples are inexpensive and conveniently located in a high density sample matrix.

Other objects and advantages will become apparent upon reading the following detailed description in conjunction with the attached drawings, in which:

FIG. 1 is a side elevation of apparatus embodying the present invention with portions removed;

FIG. 2 is an end elevation of the apparatus shown in FIG. 1, with portions removed;

FIG. 3 is an enlarged portion of the apparatus shown in FIG. 1, with portions removed;

FIG. 4 is a top plan view of one sample holder and a portion of another that can be used with the apparatus of FIG. 1; and, FIG. 5 is a cross section of a portion of the sample holder shown in FIG. 4 and is taken generally along the line 5—5 therein.

Broadly stated, the apparatus embodying the present invention is adapted to measure the gamma radiation levels or concentrations of sample cultures used in research studies in medicine and microbiology and the like. The individual samples, including cultures of various types, are given a radioactive label that provides an indication of the kind of activity it has undergone. More particularly, the apparatus of the present invention is intended to be used in the kinds of studies that often utilize the above described scintillation techniques. The apparatus embodying the present invention is therefore intended to comprise an alternative to the scintillation techniques and has applicability to transformation studies, radioimmuno assays, lifting assays, as well as mixed lymphocyte response studies, all of which are known techniques used by medical and microbiological researchers. The apparatus of the present invention is adapted to automatically measure the gamma radiation label of a substantial number of individual samples. The structure which holds the individual samples represents a significant improvement over the scintillation vials for the reason that a very small volume of the sample culture, for example about 100 microliters, is deposited upon a fibrous sheet and the culture does not need to be placed in solution as is the case for the scintillation techniques.

The sample holders generally comprise a relatively thin flat base over which the fibrous sheet is placed, with the culture samples deposited thereon at predetermined locations and a cover plate having fenestrations coinciding with the samples is resiliently attached to the base. The entire sample holder is only about 5 by 8 inches in size and preferably contains 96 separate, isolated culture samples thereon, which represents a high sample density. Since only the fibrous sheet need be replaced in subsequent use, it should be understood that the cost of materials is minimal compared to scintillation techniques utilizing separate vials for each culture sample.

For the device described herein to be used in the lifting assays mentioned above, it would measure the radioactivity remaining in an inverted tissue culture plate which would be held in the sample holder.

Moreover, when the samples are harvested from the tissue culture vessels for most transformation assays the entire contents of each individual well is washed from the well and onto the fibrous sheet; however, in some particular assays, specifically the chromium release assays, an apparatus will be used which harvests only a small volume of each sample and deposits this onto predetermined locations on the fibrous sheet. The apparatus which may advantageously be used in these latter harvesting techniques is not a part of the present invention, but is described in my co-pending application Ser. No. 589,023 filed June 23, 1975 and entitled "An Improved High Sample Density Replicator". The replicator extracts and thereafter deposits this precise volume of the sample from the individual culture wells onto the paper, and this substantially comprises the extent of the handling that is necessary to prepare samples of chromium release for measurement or counting by the apparatus embodying the present invention. In contrast, when the entire wells are harvested the radioactivity contained in the cells is confined to a particular area of the glass fiber filter paper by an "O" ring located in the pressure plate of the harvesting device until the final drying solution of 95% ethanol is rinsed through the paper.

In addition to the extremely high sample density of the sample holders, a relatively large stack of the sample holders can be placed in the apparatus, which permits the apparatus to automatically sequence and measure an extremely large number of individual culture samples without the service of an attendant.

Referring now to the drawings and particularly FIGS. 1 and 2, apparatus, indicated generally at 10, embodying the present invention is shown in a free standing configuration having a lower cabinet portion 12 and legs 14, with the cabinet portion 12 having a number of doors so that it can be used for storage and the like. It should be understood, however, that the apparatus can be a counter top unit by eliminating the storage cabinet 12, i.e., eliminating the portion below the approximate line shown at 16.

The apparatus 10 has a gamma radiation detector 18 located at a counting station, indicated generally at 20, with a display panel 22 which may provide a visual readout of the identification, counting time and radiation count of a particular sample being measured. Various controls 24 are shown below the display panel 22 for operational control of the apparatus. Electrical circuitry modules for processing the signals from the detector 18 and for generating the identification codes and other information are preferably contained within the compartment shown at 26. An adding machine printer for providing a printout of the information may be contained within the cabinet 28 to provide a written record for each of the samples being counted, although the data could be stored in a computer memory or on magnetic tape or the like. A storage or supply bin 30 is provided to hold a stack of individual sample holders 32 which are sequentially advanced to the counting station 20 by a conveying mechanism indicated generally at 34 in FIG. 3, which is located behind access doors 36 shown in FIG. 1. A conveying mechanism 34 advances the lowermost sample holder 32 from the stack and moves it laterally to the counting station where the detector 18 measures the gamma radiation label of each of the samples. After the samples of a particular sample holder 32 have been counted, the conveying mechanism continues to advance the succeeding sample holders toward the detector and the sample holder that has had all samples measured, falls into an open topped receptacle 38. The sample holders may then have the fibrous paper material removed and the base as well as the cover may be reused.

It should be apparent that the receptacle 38 is shown to be an integral part of the freestanding unit illustrated, and that a separate container or receptacle 38 may be desired to be placed at the end of a counter, in the event that a countertop unit is employed.

In accordance with an important aspect of the present invention and referring to FIGS. 4 and 5 which illustrate the sample holders 32 which are used in the apparatus, they are shown to be rectangular and flat and have dimensions that are preferably about 5 inches in width, about 8 inches in length and about one-fourth to five-sixteenths inches in overall thickness. The sample holder preferably has only three separate pieces, when the fibrous sheet itself is included, i.e., a base 40, the fibrous sheet 42 and a fenestrated cover 44. The base 40 is preferably comprised of plastic or plastic-like material that is structurally rigid and relatively lightweight, such as polypropylene, for example. The opposite edges of the two longer sides of the base 40 preferably have a curved recess 46 therein that is adapted to receive a cooperating tongue 48 that is placed in each of the two downwardly projecting side walls 50 of the fenestrated cover plate 44. Thus, the cover and base are releasably attached to one another so that the fibrous sheet 42 can be removed after the samples contained thereon have been measured by the apparatus. The cover 44 has a rectilinear array of circular apertures or fenestrations 52, each of which is preferably about ⅝ths of an inch in diameter with the spacing between centers of adjacent apertures being about ⅝ths of an inch. Thus, the measurement $d_2$ shown in FIG. 4 is approximately ⅝ths of an inch and, as is clearly shown there are eight rows each having 12 apertures 52 or a total of 96 separate apertures in the cover 44.

The fenestrated cover performs a number of functions in that it has the downwardly extending opposite side portions 50 along the length which resiliently hold the cover to the base and also holds the fibrous sheet thereto. Since the sheet 42 is sandwiched between the cover and the base, it is maintained at a predetermined distance from the detector 18 to thereby greatly minimize the possibility of inaccuracy that could be introduced due to a variation in the distance between the detector and the sample. The cover 44 is preferably made of an aluminum alloy that may contain a small amount of lead, although other materials could be used. However, the aluminum alloy cover also functions as a radiation shield in that it tends to isolate the sample from an adjacent sample to thereby prevent the radiation from an adjacent sample influencing the detector and detrimentally affecting the results of the sample being measured. Thus, the cover maintains the somewhat flexible fibrous sheet having the samples thereon immobile, maintains the sheet at a predetermined distance from the detector 18 when the samples are being measured and also provides an isolating shield that protects the integrity of the measurement from the influence of radiation in adjacent samples. Moreover, the cover provides some degree of protection for the samples in the storage bin 30 when the holders are stacked as shown in FIGS. 1 and 3.

It should be noted that the distance shown as $d_2$, and described herein as being about ⅝ths of an inch, is uniform between all of the horizontal rows in FIG. 4 and that the distance between centers of adjacent fenestrations within each of the rows is also uniform and is also preferably about ⅝ths inches. However, the distance between the apertures in the rows adjacent the opposite edges of the sample holder are less than the ⅝ths inch spacing, and this spacing $d_1$ is preferably slightly less than half of the distance $d_2$, so that as the conveying mechanism 34 advances succeeding sample holders toward the counting station 20 as shown in FIGS. 1 and 3, the separation between the last row of the forward sample holder and the first row of the subsequent sample holder will be the same distance $d_2$ as the spacing between adjacent rows. This is advantageous in that the mechanism 34 that advances the sample holders toward the counting station need not have to compensate for a change in sample holders and in fact only needs to advance the sample holder the incremental distance $d_2$ after all samples in a particular row have been measured regardless of whether the next row is on the same sample holder or on the succeeding sample holder. Therefore, an unusually elaborate mechanism is not required to identify and perhaps compensate or adjust for the changing of the sample holders.

To advance the sample holders 32 from the storage bin 30, the apparatus has a conveying mechanism 34 which comprises a pair of endless links 56 which is preferably a chain or suitable flexible, in-elastic belt. It is preferred that the flexible links 56 be comprised of a ball chain or the like so that suitable toothed sprockets can be used to reduce the possibility that the relative positions of the links remain the same. This is important for the reason that each of links 56 have transverse projections or pins 58 secured at predetermined locations around the links which are adapted to engage the sample holders 32 and move them toward the detector. If one of the links 56 falls behind the other, then the pins on opposite sides of the sample holder will not be accurately aligned and the sample holder will be moved toward the detector at an angle, provided that other guide means are not employed. In this regard, it should be understood that a single flexible link having the pins 58 attached thereto may be employed if the path from the holding bin 30 to the detecting station 20 has suitable guide means that would prevent the individual sample holders from deviating from their desired position. The pins 58 are of sufficient length so that they engage the single lowermost sample holder 32 in the stack thereof in the supply bin 30 and move it toward the counting station 20.

In keeping with the present invention, the spacing between the adjacent pins 58 is preferably only slightly larger than the width of the individual sample holders so that very little spacing between adjacent sample holders is present. This enables the conveying mechanism to be operable to increment the sample holders toward the detector at the uniform incremental distance $d_2$ as shown in FIG. 4 so that the conveying mechanism 34 does not have to discriminate between sample holders in its operation. The flexible link or chain 56 is movable around an endless loop, and travels over rotatable pulleys or sprockets 60. The pulleys 60 are preferably attached to a shaft 62 which carries both pulleys 60 of the adjacent link as best shown in FIG. 2. To drive the flexible links 56, a stepping motor 64 is preferred and the motor is shown to have its output shaft connected to a drive pulley or a sprocket 66. Other drive schemes such as a motor with operating limit switches or the like may also be used, if desired. However, it is believed that the preprogrammed stepping motor which only advances the links 56 the incremental distance $d_2$ when it is actuated offers a convenient and reliable means for driving the links. Suitable control circuitry is incorporated into the apparatus to energize the stepping motor 64 when the samples within a row have been measured and the next row is to be brought into close proximity to the detector 18. The flat surface upon which the trays 32 are moved have a pair of elongated openings 68 through which the pins 58 may pass to engage the sample holders.

In accordance with another important aspect of the present invention and turning to the counting station indicated generally at 20, the detector 18 is movable along the lengthwise direction of the sample holder 32 or horizontally as shown in FIG. 2. Thus, each of the twelve samples within each row can be individually measured by moving the detector from one sample location to an adjacent location after the measurement has been completed.

To provide for the moving of the detector, the apparatus includes a mechanism similar to the conveying mechanism 34 used to advance the sample holders toward the detector 18. As shown in FIGS. 1 and 2, the detector 18 is mounted on a block member 70 which is slideable on a stationary preferably stainless steel rod 72 that is suitable anchored at opposite ends. The block member 70 has an aperature extending therethrough with an inside diameter substantially similar to the outer diameter of the rod 72 and is slideable thereon. The block and rod arrangement are used to insure that the critical spacing of the detector relative to the samples being measured is maintained constant so that the accuracy of the results will not be affected thereby.

To slide the member 70 along the rod 72, a pair of flexible links 74 are provided which travel around pulleys or sprockets 76 that are mounted on shafts 78. Each of the shafts 78 carry two pulleys 76 as best shown in FIG. 1 so that both links 74 are driven at the same speed. To drive the links 74, a stepping motor 80 is provided and its output shaft carries a drive sprocket or pulley 82. A pressure or backup roller 84 may be provided adjacent the drive pulley 82 to prevent slipage or the like if desired. The stepping motor 80 is also preprogrammed to move from sample location to sample location which is also the distance $d_2$ as shown in FIG. 4. Thus, as soon as one sample has been measured for its gamma radiation content by the detector, the stepping motor is energized to move it to the adjacent sample for its measurement. After the apparatus has sequenced through the last sample in the row, the stepping motor is reversed and the detector is brought back to the initial position. Either during or after the detector has returned to its initial position, the stepping motor 64 driving the conveyer mechanism 34 is energized to bring a succeeding row in proximity to the detector 18 and the apparatus may then sequence through the twelve samples of the new row. The detector 18 may be a sodium iodide crystal detector with a beryllium window, such as is manufactured by Teledyne Isotopes of Westwood, N.J., or a solid state silicone surface barrier detector such as is made by Gamma-Tech, Inc. of Princeton, N.J., or Ortech Inc. of Oak Ridge, Tenn., may be employed, provided that the sensitivity and resolution of the solid state detectors is sufficient to obtain accurate results. When a sample is being measured for its gamma radiation concentration, the apparatus obtains a maximum count in about 15 to 30 seconds if the gamma radiation label is quite high. On the other hand, if there is very little label remaining in the sample being tested, then the measurement is terminated after about 1 minute and the count at that time is recorded. It should be understood that while the apparatus shown in the drawings has a single detector that is adapted for movement along the rows so that it can measure each of the 12 samples in each row, that more than one detector could be employed so that multiple readings could be simultaneously taken. In this regard, two, three, four, six or even 12 detectors could be employed if desired, it being understood that duplication and modification of other portions of the apparatus such as the electrical circuitry and the like would be required. The block 70 may be vertically adjustable to calibrate the radioactivity and to accommodate the inverted tissue culture vessels to be in the lifting.

From the foregoing description, a greatly improved apparatus and sample holder construction has been described which offers many significant advantages in terms of convenience and cost. With respect to cost considerations, the preparation of individual samples is quite simple and does not require a significant amount of a technician's time. The measurement of the gamma radiation by the apparatus is relatively quick and does not require any significant corrections or compensating steps. Moreover, the only continuing cost is the cost of the fibrous sheets, which is minimal compared to cost of the vials used in the scintillation technique. The high density of the samples on the sample holder coupled with its relatively small size and shape permits a large number of sample holders to be stacked on one another, which permits virtually thousands of samples to be automatically sequenced through the apparatus as compared to only a few hundred for the largest known scintillation vial sequencing machines. Moreover, the relative simplicity of the apparatus compared to most scintillation machines keeps the initial cost of the apparatus at a manageable level that many research laboratories can easily afford. Moreover, the elimination of time consuming preparation steps for each sample that is necessary using the scintillation technique permits the relatively expensive technicians to permit other functions that may be more beneficial and commensurate with their technical skills.

Although various embodiments of the invention have been illustrated and described, variations, modifications and alternative constructions may be suggested to those skilled in the art. Accordingly, the scope of the protection to be afforded this invention should not be limited by the particular embodiments shown and described, but should be determined in terms of the definitions of the invention set forth in the appended claims, and equivalents thereof.

Various features of the invention are set forth in the following claims:

What is claimed is:

1. Apparatus for measuring the gamma radiation label in each of a plurality of samples located in a number of rows on a sheet member carried by a sample holder, comprising:
    a measuring station having at least one gamma radiation detector adapted for movement along a first path;
    means for moving said detector along said first path from sample location to sample location within a row of samples to thereby measure the gamma radiation label of each of said samples along said first path;
    means for holding a plurality of said sample holders; and,
    means for sequentially advancing said sample holders from said holding means to said measuring station to bring successive rows in line with said first path for measuring the gamma radiation label of said samples and for thereafter moving said sample holder away from said measuring station, said sequential advancing means comprising an endless flexible link means movable around a closed loop, the upper reach of which is generally horizontal and defines a second path, the endless belt having a series of spaced apart transverse projections adapted to engage a single sample holder and move the same toward said measuring station as said belt moves around said loop and means for driving said endless belt around said loop.

2. Apparatus as defined in claim 1 wherein each of said sample holders comprises a generally flat rectangular support member and a cover, said sheet member being located between said support member and cover and comprising a thin fibrous sheet adapted to absorb a measured amount of sample solution containing a radioactive label at predetermined locations spaced apart from one another and located in successive rows, said cover having a plurality of fenestrations exposing said plurality of sample locations of said fibrous sheet.

3. Apparatus as defined in claim 2 wherein said cover and support member have respective cooperating tongue and groove portions for resiliently holding said cover to said support member.

4. Apparatus as defined in claim 3 wherein said cover has opposed downwardly directed sidewalls with facing tongue portions, each of which are adapted to engage aa groove located in the adjacent sidewall of said support member.

5. Apparatus as defined in claim 2 wherein said cover includes a linear array of said fenestrations generally arranged in rows and columns.

6. Apparatus as defined in claim 5 wherein said cover has eight rows of fenestrations and each row has 12 fenestrations.

7. Apparatus as defined in claim 2 wherein said cover is fabricated from an aluminum alloy.

8. Apparatus as defined in claim 1 wherein said sequential advancing means is adapted to move said sample holder an incremental distance so as to bring a subsequent row of samples into proximity with aid detector.

9. Apparatus as defined in claim 1 wherein said detector moving means comprises a guide means holding said detector a predetermined distance from said sample holder and slideable along said first path, link means connecting said detector to a controllable drive means to move said detector a predetermined distance along said first path, said predetermined distance being equal to the spacing between sample locations.

10. Apparatus as defined in claim 9 wherein said link means comprises a pair of laterally spaced ball chains, each of which is connected to said detector.

11. Apparatus as defined in claim 9 wherein said driving means comprises a step motor adapted to move said chain means a predetermined distance in response to being activated.

12. Apparatus as defined in claim 1 wherein said plurality of samples are located in a rectilinear array having rows and columns with the rows being generally parallel to said first path so that movement of said detector along said first path brings said detector into proximity with each of said samples in said row to measure the gamma radiation label thereof.

13. Apparatus as defined in claim 1 wherein said driving means comprises a step motor operably connected to said endless flexible link means.

14. Apparatus as defined in claim 1 wherein the spacing between said transverse projections exceeds the dimension of said sample holders so that each of said projections engages a sample holder from said holding means and advances the same toward said measuring station in response to movement of the upper reach of said endless link means along said second path.

15. Apparatus as defined in claim 1 wherein each of said transverse projections comprise laterally spaced apart pins adapted to contact a sample holder near opposite ends thereof and move the same toward said measuring station.

16. Apparatus as defined in claim 1 wherein said holding means comprises a guide means for stacking said plurality of sample holders on one another, said guide means permitting a single sample holder to be initially advanced from said holding means toward said measuring station.

17. Apparatus for holding a plurality of samples located in a rectilinear array for use in gamma radiation counting apparatus and comprising:
a generally flat support member having a generally rectangular surface area;
a thin fibrous absorbent sheet member overlying said surface area and containing a plurality of sample locations in a plurality of rows and columns spaced apart from one another;
a shielding cover overlying said fibrous sheet and being resiliently coupled to said support member, said cover having a plurality of fenestrations generally coinciding with said sample locations, said cover being adapted to isolate one sample location from an adjacent sample location during gamma radiation counting and to maintain said fibrous sheet in predetermined and uniform spacial relation relative to the counting apparatus.

18. Apparatus as defined in claim 17 wherein said cover has downwardly depending side members with inwardly protruding tongue portions and said support member has cooperating recesses adapted to receive said tongue members in fitting engagement.

19. Apparatus as defined in claim 18 wherein said support member is fabricated of a plastic-like material and has a thickness generally coextensive with the length of said downwardly depending side members and containing said recesses.

20. Apparatus as defined in claim 17 wherein the spacing between adjacent rows of samples is a uniform predetermined distance and the distance from the row adjacent each edge thereof is approximately one half of said predetermined distance so that two of said samples arranged in close edge relation would also have the rows of each apparatus adjacent the edges spaced said uniform predetermined distance from one another.

21. Apparatus as defined in claim 17 wherein eight rows, each row having 12 samples are arranged thereon in said rectilinear array.

22. Apparatus as defined in claim 17 wherein the outside dimensions are about 5 inches by 8 inches and the fenestrations are about ⅜ inch diameter openings spaced on about ⅝ inch centers.

23. Apparatus as defined in claim 17 wherein said cover is fabricated from aluminum.

24. Apparatus for measuring the gamma radiation label in each of a plurality of samples located in a number of rows on a sheet member carried by a sample holder, comprising:
a measuring station station having at least one gamma radiation detector adapted for movement along a first path;
means for moving said detector along said first path from sample location to sample location within a row of samples to thereby measure the gamma radiation label of each of said samples along said first path;
means for holding a plurality of said sample holders;
means for sequentially advancing said sample holders from said holding means to said measuring station to bring successive rows in line with said first path for measuring the gamma radiation label of said samples and for thereafter moving said sample holder away from said measuring station; and,
each of said sample holders comprising a generally flat rectangular support member and a cover, said sheet member being located between said support member and cover and comprising a thin fibrous sheet adapted to absorb a measured amount of sample solution containing a radioactive label at predetermined locations spaced apart from one another and located in successive rows, said cover having a plurality of fenestrations exposing said plurality of sample locations of said fibrous sheet.

25. Apparatus as defined in claim 24 wherein said sequential advancing means comprises an endless flexible link means movable around a closed loop, the upper reach of which is generally horizontal and defined a second path, the endless belt having a series of spaced apart transverse projections adapted to engage a single sample holder and move the same toward said measuring station as said belt moves around said loop and means for driving said endless belt around said loop.

* * * * *

UNITED STATES PATENT AND TRADEMARK OFFICE
CERTIFICATE OF CORRECTION

PATENT NO. : 3,986,028
DATED : October 12, 1976
INVENTOR(S) : William J. Byrd

It is certified that error appears in the above—identified patent and that said Letters Patent are hereby corrected as shown below:

Col. 6, line 44   "suitable" should be --suitably--.

Col. 7, line 60   "permit" should be --perform--.

Col. 8, line 54
Claim 4           "aa" should be --a--.

Col. 8, line 67
Claim 8           "aid" should be --said--.

Col. 10, line 29
Claim 24          "station station" should be --station--.

Col. 10, line 59
Claim 25          "defined" should be --defines--.

Signed and Sealed this

Twenty-sixth Day of April 1977

[SEAL]

Attest:

RUTH C. MASON
Attesting Officer

C. MARSHALL DANN
Commissioner of Patents and Trademarks